United States Patent [19]
Aratani

[11] Patent Number: 6,049,521
[45] Date of Patent: Apr. 11, 2000

[54] OPTICAL RECORDING MEDIUM AND METHOD FOR PRODUCING SAME

[75] Inventor: Katsuhisa Aratani, Chiba, Japan

[73] Assignee: Sony Corporation, Tokyo, Japan

[21] Appl. No.: 08/869,143

[22] Filed: Jun. 4, 1997

[30] Foreign Application Priority Data

Jun. 5, 1996 [JP] Japan ..................................... 8-142915

[51] Int. Cl.[7] .................................. G11B 3/70; G11B 7/24
[52] U.S. Cl. ................... 369/280; 369/275.1; 369/275.3; 369/275.4
[58] Field of Search ...................... 346/135.1; 369/275.1, 369/275.2, 280, 284, 275.4, 275.3; 427/551; 428/694; 430/201

[56] References Cited

U.S. PATENT DOCUMENTS

| | | | |
|---|---|---|---|
| 3,946,367 | 3/1976 | Wohlmut et al. ........................ | 369/32 |
| 4,219,704 | 8/1980 | Russell ..................................... | 369/108 |
| 5,455,818 | 10/1995 | Ohashi ..................................... | 369/284 |
| 5,645,909 | 7/1997 | Kobayashi et al. .................. | 369/275.2 |
| 5,693,447 | 12/1997 | Takeyama et al. ..................... | 430/201 |
| 5,708,652 | 1/1998 | Ohki et al. ............................ | 369/275.1 |
| 5,726,970 | 3/1998 | Kaneko et al. ....................... | 369/275.2 |
| 5,764,619 | 6/1998 | Nishiuchi et al. .................... | 369/275.1 |
| 5,878,018 | 3/1999 | Moriya et al. ........................ | 369/275.1 |

*Primary Examiner*—David L. Ometz
*Assistant Examiner*—Angel Castro
*Attorney, Agent, or Firm*—Hill & Simpson

[57] ABSTRACT

An optical recording medium having a substrate 1 and one or more recording layers 2, 4 formed on the substrate 1. A sufficient volume of the laser light is illuminated on the recording layer 4 further away from a light source, while a sufficient amount of the reflected light from the recording layer 4 is received, for realizing optimum recording and/or reproduction for the recording layers 2, 4. To this end, a recording film material of at least the first recording layer looking from the laser light incident side is depleted partially.

10 Claims, 8 Drawing Sheets

OPTICAL RECORDING MEDIUM AND METHOD FOR PRODUCING SAME

BACKGROUND OF THE INVENTION

1. Field of the Invention

This invention relates to an optical recording medium and, more particularly, to an optical recording medium having plural recording layers.

2. Description of the Related Art

Among read-only optical discs, there is such a disc in which a reflective metal layer, composed mainly of aluminum, is formed as a recording layer on a transparent substrate on which are formed crests and valleys corresponding to the data information. An example of such disc is a so-called compact disc. In such optical disc, attempts are made for increasing the surface recording density for increasing the recording capacity.

On the other hand, there is recently developed an optical disc in which the recording layer is formed by multiple layers for increasing the recording capacity. An example of this type of disc is a digital video disc (DVD). For such digital video disc, there is proposed a disc of the type in which two recording layers are formed on the same substrate such that the effective recording capacity is twice that of the single-layer disc.

If, in the optical disc having plural recording layers, the laser light is illuminated on one of the major surfaces of the disc for independently reproducing information signals of the respective recording layers, it is required of the recording layer on which the laser light is incident that such recording layer be of higher transmittance for transmitting the laser light to the other recording layer lying further than the light incident side layer. Thus, in such multi-layer optical disc, a metal reflective layer thinner in thickness than the layer used for a single-layer optical disc, or a dielectric layer having a higher refractive index and lower light absorption, is used as a laser light incident side recording layer, so that more than one-half of the incident light intensity is transmitted through this recording layer. This enables the laser light to be accorded to the second and even third or fourth layers, while also enabling the return light to be received from these recording layers. The recording layers of the multi-layer optical disc are termed first, second, third, . . . n'th recording layers, looking from the reproducing laser light incident side.

Meanwhile, a dye material, a phase transition material or a magneto optical recording material is used as a recordable type recording material for the optical disc. If these recordable type recording materials can be used for the multi-layer type optical disc, the optical disc is expected to be improved further in utility. Such optical disc may possibly be configured by layering plural recordable type recording layers or by using the combination of the read-only recording layers and the recordable type recording layers.

However, with the recordable type recording layers, it is difficult to raise the transmittance for the following reason, such that it is difficult to realize the configuration in which the recordable type recording layer is used as the first recording layer.

That is, the magneto optical recording material or the phase transition material is a heat mode type recording material in which the temperature rises by absorption of the laser light and in which pits are formed by such rise in temperature. Thus, for effecting the recording, the light needs to be absorbed to a more or less extent. For this treason, the materials need to be lowered in transmittance.

Moreover, for obtaining a high playback signals level, or optimizing heat response characteristics during recording, the usual practice is to have the recording layer sandwiched between two dielectric layers and to form a reflective metal layer composed mainly of aluminum or gold thereon.

If it is attempted to reduce the overall thickness of a three-layer recording portion, comprised of the recording layer sandwiched between the two dielectric layers, the magneto optical recording layer, for example, a TbFeCo layer, needs to be of an extremely thin thickness of 10 nm or less, thus leading to the playback signal level not more than one-half of the conventional signal level. The result is that it becomes difficult to raise the recording density such that the merit of the multiple recording layers cannot be exploited sufficiently. The same may be said of the phase transition type recording material.

In particular, with the phase transition recording layer, the recording state depends strongly on the cooling rate after laser light irradiation. That is, the phase transition type recording material is crystalline in the initial state and, on irradiation with the laser light, micro-sized areas thereof are raised in temperature to higher than its melting point and then cooled to form amorphous portions (pits). If the recording portion in its entirety is reduced in thickness and hence the metal reflective layer is reduced in thickness, an area of the metal. reflective layer heated to higher than the melting point is slowed down in the cooling rate thereof, because the metal reflective layer also performs the role of a heat sink. Thus the area is re-crystallized before cooling to ambient temperature. If the cooling rate is lowered further, the film material is deteriorated due to repetition of recording.

For the multi-layer optical disc, such a configuration may be envisaged in which the second recording layer is a recordable type recording layer and in which the laser light incident side first recording layer is a read-only recording layer. Such configuration is more likely to be implemented than the configuration of using the recordable type recording layer as the first recording layer because the read-only recording layer can be raised in transmittance by controlling its thickness or material type. However, although the playback output of an acceptable level can be realized from the second recording layer in this case, a laser power larger than that for reproduction needs to be supplied for recording on the second recording layer. For assuring transmittance sufficient for producing such laser power, it is insufficient to control the thickness or material of the first recording layer.

SUMMARY OF THE INVENTION

It is therefore an object of the present invention to provide an optical recording medium in which a sufficient volume of the laser light is illuminated on the recording layer further from a laser light source and also a sufficient volume of the reflected light from the recording layer is received for realizing optimum recording and/or reproduction for each recording layer.

An optical recording medium according to the present invention is such a recording medium in which one or more recording layers are formed on a substrate, and in which a recording film material of at least the first recording layer looking from the laser light incident side is depleted partially.

A method for producing an optical recording medium according to the present invention is such a method in which crests and valleys are formed on a substrate, and a recording layer is formed only on one of the crests and valleys.

Preferably, the recording film material is uniformly heaped on the substrate and part of the recording film material is subsequently removed.

If, in an optical recording medium having plural recording layers formed on the substrate, the recording film material of at least the first recording layer looking from the laser light incident side is depleted partially, part of the laser light incident on the first recording layer is transmitted through the depleted portion to be illuminated on the underlying recording layer. Thus, sufficient volume of the laser light is illuminated on the recording layer further away from a light source, while a sufficient amount of the reflected light from the recording layer is received, thereby realizing optimum recording and/or reproduction for the recording layers. With the recording layer having the partially depleted recording film material, fluctuations in the cross-talk caused by laser power fluctuations and insufficient pit erasure can be prevented for achieving optimum recording/reproducing characteristics, while erasure and overwrite characteristics may also be improved.

DESCRIPTION OF THE PREFERRED EMBODIMENTS

Figure 1:
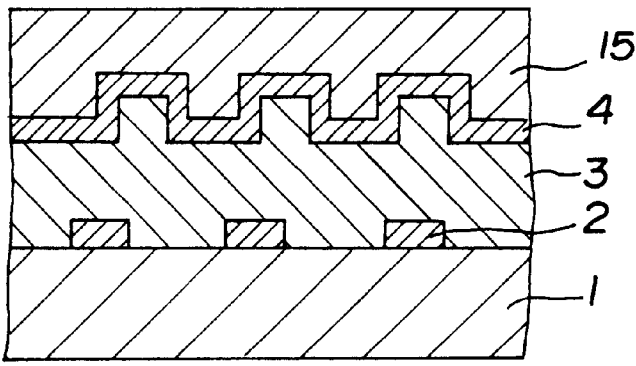
FIG. 1 is a schematic cross-sectional view showing essential portions of an illustrative structure of an optical recording medium embodying the present invention.

Referring to the drawings, preferred embodiments of the present invention will be explained in detail.

FIG. 1 shows an example of an optical recording medium according to the present invention.

The optical recording medium shown in FIG. 1 includes a first recording layer 2 formed on a transparent substrate 1, a second recording layer 4 formed on the first recording layer 2 via a spacer layer 3 and a protective layer 15 formed on the second recording layer 4. In the optical recording medium, the laser light is illuminated from the side of the transparent substrate 1 so as to be converged on the first recording layer 2 for recording and/or reproducing information signals thereon. The laser light is also illuminated from the side of the transparent substrate 1 so as to be transmitted through the first recording layer 2 and converged on the second recording layer 4 for recording and/or reproducing information signals thereon.

In the present optical disc, a plastic or glass substrate formed of polycarbonate or polymethacrylate (PMMA) resin is used as the transparent substrate 1.

The first recording layer 2 or the second recording layer 4 may be a read-only recording layer or a recordable type recording layer.

For the read-only recording layer, a metal reflective layer, composed mainly of Al or Au, or a reflective layer, composed of a dielectric material or a semiconductor material, is used as a recording layer. Of these, the metal reflective layer may be formed solely of Al or Au, optionally admixed with Ti for preventing corrosion.

The recordable type recording layer is classified into a write-once type recording layer on which the information can be recorded by the user only once and an overwrite type recording layer on which the information can be recorded and erased repeatedly.

For the write-once type recording layer, a low-melting thin metal layer, a layer of s phase-transition type material, such as a Ge—Sb—Te film or a film containing an organic dye, is formed as a recording layer.

For the overwrite type recording layer, a perpendicular magnetic recording film exhibiting magneto-optical properties, such as Kerr effect or Faraday effect, for example, a Tb—Fe—Co amorphous alloy thin film, is formed as a recording layer.

Figure 2:
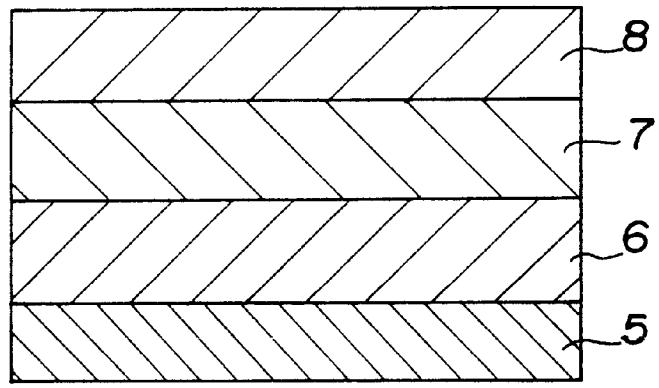
FIG. 2 is a schematic cross-sectional view showing essential portions of a recording portion made up of four layers inclusive of a recordable type recording layer.
Figure 3:
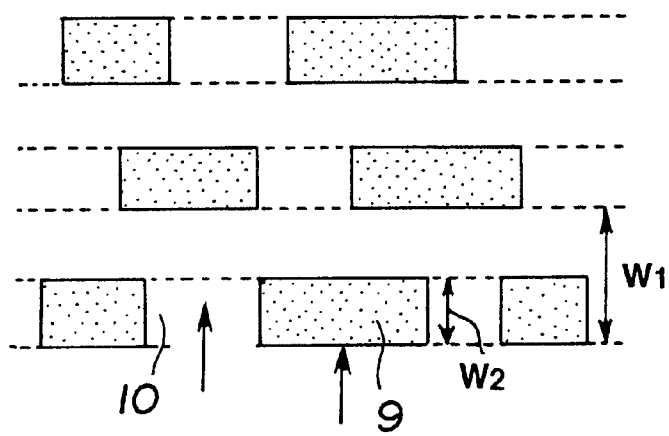
FIG. 3 is a schematic view showing an interrupted pattern of a first recording layer.

The recordable type recording layer may be made up of dielectric layers 5, 7 and a reflective layer 8, in addition to the recording layer 6, for increasing the reflectance and signal modulation factor, assuring heat sink effect and for protecting the recording layer, so that the recordable type recording layer is of a multi-layer structure made up of the first dielectric layer 5, recording layer 6, second dielectric layer 7 and the reflective layer 8, as shown in FIG. 2.

For the dielectric layers 5, 7, oxides or nitrides may be used. For example, a thin film of silicon nitride or aluminum nitride or a mixed film of $ZnS$—$SiO_2$ film, may be used.

The reflective layer 8 is preferably comprised of a high-reflectance film reflecting not less than 70% of the laser light on the boundary to the second dielectric layer 7. A metal reflective layer mainly composed of Al or Au is preferred. These metals may be optionally admixed with Ti for preventing corrosion.

Between the first recording layer 2 and the second recording layer 4, a spacer layer 3 for optically isolating these recording layers is formed to a thickness exceeding the focal length of the laser light. The spacer layer 3 is formed by, for example, a photopolymer method. If the second recording layer 4 is a read-only layer, crests and valleys corresponding to the information signals are formed on the spacer layer 3, whereas, if the recording layer 4 is a recordable type recording layer, crests and valleys corresponding to the guide grooves or the address information are formed thereon.

The protective layer 15, formed on the second recording layer 4, protects the first recording layer 2 and the second recording layer 4 from impact from outside or from moisture. The protective layer 15 may be formed of, for example, an UV curable type resin, such as acrylic resin.

With the optical recording medium, the recording film material of the first recording layer 2 on the input side of the laser light is partially depleted for realizing high transmittance at the interrupted portions. With the optical recording medium, if the recording layer itself has zero transmittance, the laser light illuminated from the side of the transparent substrate 1 is transmitted through the interrupted portions so as to be received by the photodetector. That is, sufficient light intensity may be achieved for the second recording layer further from the laser light source via the interrupted portions. In addition, the reflected light from the second recording layer 4 may be received with sufficient intensity. Thus it becomes possible to realize optimum recording and/or reproduction for the second recording layer 4.

The effective transmittance of the first recording layer 2, that is the average transmittance of the first recording layer 2 inclusive of the interrupted portions, cannot be uniquely determined since it depends on the area of deposition of the recording layer 2, intensity of the laser light, phase distribution, state of polarization and the film material as well as film thickness f the recording layer. The value given by the following equation:

$$T = P + (1-P)T1$$

may be used as a measure for the average transmittance. In the above equation, T is the average transmittance of the first recording layer 2 inclusive of the interrupted portion, T1 is transmittance of the recording layer itself, and P is the proportion of the depleted portions in the recording layer.

In the above equation, T1 is of an extremely small value in a metal reflective layer used in a read-only layer r a magneto optical recording film, phase transition recording film or an organic dye recording film used in a recordable type recording film, and may be deemed to be approximately zero. The value of T1 needs to be taken into account in the case of a semi-transparent film used in a read-only two-layered structure optical disc. The average transmittance T is preferably higher by 10% or more than the transmittance T1 of the recording layer itself.

Realistically, the pattern of the interrupted portions of the first recording layer 2 is associated with the format of the recording layer.

For example, if the first recording layer 2 is of the read-only type, the pattern of the interrupted portions is preferably associated with data pits as information signals, so that the recording film material is deposited only on data pits 9 without being deposited in other portions 10. In such pattern, the proportion of the interrupted potions is given by 1−W2/W1 L, where W1, W2 and L denote the track pitch, pit width and the rate of area taken up by the pits in the circumferential direction.

If the first recording layer 2 is of the recordable type, and the recording film material is interrupted in a space between the recording tracks, the average transmittance T of the recording layer 2 is increased, while fluctuations in the cross-talk caused by fluctuations in the laser power or insufficient pit erasure are evaded.

Figure 5:
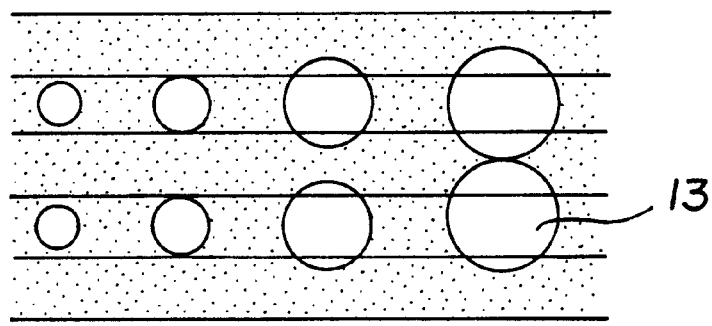
FIG. 5 is a schematic view showing the relation between the recording power and pit size in a conventional optical recording medium.

That is, if dust and dirt are affixed to the surface of the substrate of an optical recording medium, the light path of the laser light is interrupted, thus occasionally lowering the laser power on the focal plane to a value lower than the setting value. If the recording layer is formed uniformly, and such fluctuations in the laser power are produced, the size of the pit formed in the recording layer is changed in both the longitudinal and transverse directions. Referring to FIG. 5 showing pits 13 formed with various values of the recording power, the size of the pits 13 is increased with increased values of the recording power. Such change in the transverse size of the pits varies the amount of signal leakage to the neighboring tracks, that is the amount of cross-talk. If, for pit erasure or overwriting, the laser spot size is reduced, insufficient pit erasure results if the pits have been formed with a particularly high recording power.

Figure 6:
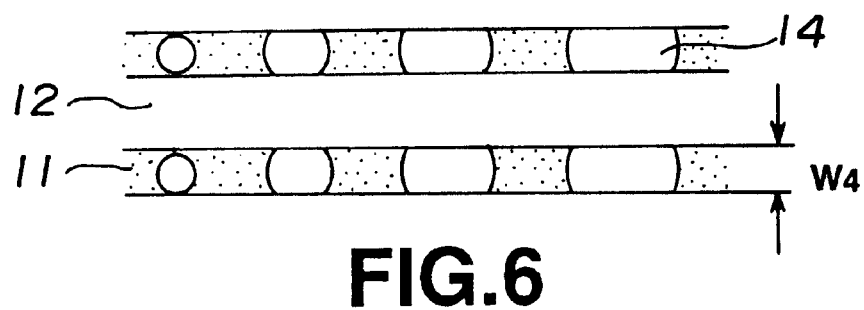
FIG. 6 is a schematic view showing the relation between the recording power and pit size in an optical recording medium embodying the present invention.

Conversely, if the recording film material is interrupted between the recording tracks 12, these interrupted portions cannot contribute to recording, so that the pit width cannot exceed the track width W4. Therefore, if the recording power used is such that it exceeds the recording power for which the pit width is equal to the track width W4 and for which the pit does not affect the neighboring track, the width of the pit 14 is equal at all times to the track width W4, as shown in FIG. 6, thus suppressing fluctuations in the amount of cross-talk otherwise produced by fluctuations in the laser power. If such range of the power is used for erasure or overwriting, insufficient pit erasure is not produced even if the laser power is fluctuated to a slightly lesser extent. The result is the optimum erasure and overwrite characteristics.

The proportion of the interrupted portions in the first recording layer 2 is preferably 25%.

If the proportion of the interrupted portions of the first recording layer 2 is not less than 25%, the average transmittance T of the first recording layer 2 is not less than 25%, even if the transmittance of the recording layer itself is zero. In this case, not less than 25% of the laser light incident on the first recording layer 2 is illuminated on the second recording layer 4, while not less than 25% of the reflected light from the second recording layer 4 is received by the photodetector. If the reflectance of the second recording layer 4 is 80%, as an example, the reflected light from the second recording layer 4 is received by the photodetector at a rate of 0.25 0.8 0.25=0.05 times the illuminated light volume, if the reflectance of the second recording layer 4 is 80%, as an example. This reflectance is larger than the reflectance of 0.04 on the interface between air and the glass, plastics or the organic transparent protective film, thus enabling the modulation factor to be achieved relative to these to realize focusing servo or the like operation and signal reproduction.

If the proportion of the interrupted portions of the first recording layer 2 is not less than 25%, it becomes possible to suppress fluctuations in the amount of the cross-talk and insufficient pit erasure caused by fluctuations in the laser power.

For example, if the track pitch is 0.85 μm, the width W4 of the recording track is 0.64 μm and the width of the interrupted portion is 0.21 μm, the proportion of the interrupted portions accounts for approximately 25%.

Figure 7:
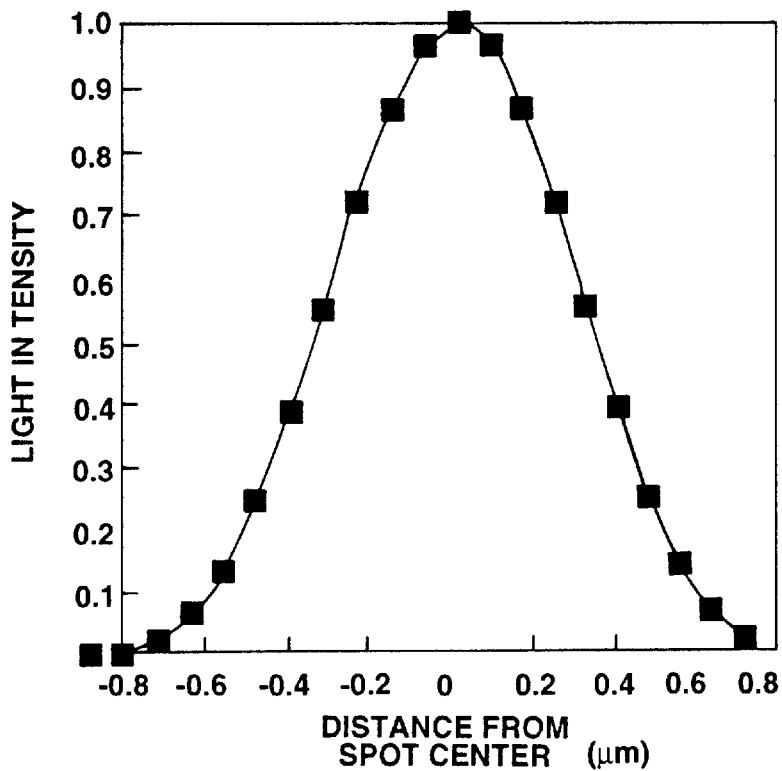
FIG. 7 is a graph showing the light intensity distribution in a laser light spot.

FIG. 7 shows the light intensity distribution in a laser light spot with the wavelength λ of 690 nm and a numerical aperture NA of the objective lens of 0.55. In FIG. 7, the abscissa denotes the distance from the spot center, while the ordinate denotes the light intensity represented as a relative value with the light intensity at the spot center being 1. The light intensity distribution is reflected in the temperature distribution in the spot.

If such laser light is illuminated on the recording track 11 having the above width of 0.64 μm, edge portions of the recording track 11 correspond to 0.32 μm and −0.32 μm on the abscissa in FIG. 7, while the edge portions of the neighboring track 11 correspond to 0.53 μm and −0.53 μm on the abscissa in FIG. 7. The ranges of from 0.32 μm to 0.53 μm and from −0.32 μm to −0.53 μm correspond to the interrupted portions. Referring to FIG. 7, the light intensity at the positions of 0.32 μm and −0.32 μm is 0.52, while that at the positions of 0.53 μm and −0.53 μm is 0.15.

If the recording power of the mark width equal to the recording track width W4 (minimum recording power) is P1, the pit width is equal at all times to the recording track width W4, if the recording power is on the order of P1 0.57/0.15. Since this power range is sufficiently larger than the usual amount of fluctuations of the laser power, stable recording, erasure and overwriting can be realized by using the power range.

In the first recording layer 2, the larger the proportion of the interrupted portions, the larger becomes the average transmittance T, but the smaller becomes the signal level. If the signal level which is the same as that of the conventional optical disc is used as the standard, the proportion of the interrupted portions of the recording layer 2 is selected to be in a range of 50 to 90%.

Figure 8:
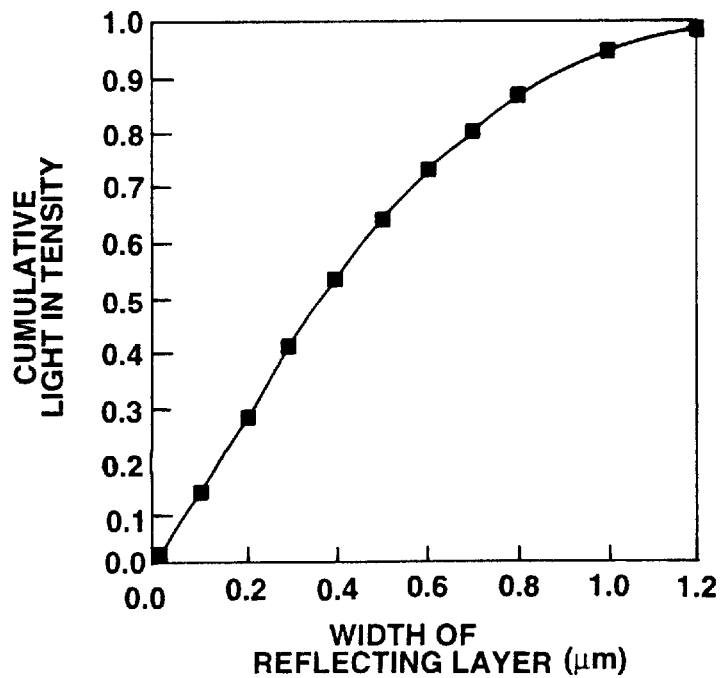
FIG. 8 is a graph showing the relation width of the reflective layer and cumulative values of the light intensity of light illuminated on the reflective layer.

FIG. 8 shows cumulative values of the light intensity when the laser light having the light intensity distribution shown in FIG. 7 is illuminated on the reflective layer having a pre-set width. In FIG. 8, the abscissa and the ordinate denote the width of the reflective layer and the cumulative value of the light intensity of the light illuminated on the reflective layer, represented as a relative value to the cumulative value of the light intensity of the entire spot, respectively. For convenience of explanation, the reflectance of the reflective layer is assumed to be 1. Thus the relative value of the light intensity represented on the abscissa means the proportion of the return light volume to the laser light volume illuminated on the reflective layer. Thus, for the track width equal to zero, the return light volume is also zero. As long as the track width is smaller than the spot radius, the return light volume is increased with increased track width. If the track width is not less than 1.2 μm, that is sufficiently larger than the spot radius, the return light volume is equal to 1.

First, in the conventional read-only optical disc, a reflective layer is formed on a transparent substrate on which a pattern of crests and valleys are formed in meeting with the information signals. In such optical disc, the return light from the valley (data pot) and that from the crest differ from each other in phase, such that, if the valley and the crest co-exist in the same spot, the return light from the valley (data pot) and that from the crest interfere with each other on the photodetector. The information signal is reproduced by the resulting changes in the light volume. Conversely, the read-only optical disc in which the reflective layer is affixed only to the data pit portions 9 of the transparent substrate has no optical crests nor valleys, such that the information signal is reproduced based on the difference in the return light volume from the portion having the reflective layer deposited thereon and that devoid of the reflective layer.

In the conventional read-only optical disc, the pit depth is set to λ/4. If the pit width is 0.3 to 0.4 μm, the light volume after interference becomes zero, thus realizing the maximum signal output. Although the pit length differs from one data signal modulation system to another, the ratio of the pit length and the interval between the pits along the circumferential direction is set on an average to unity.

In such conventional read-only optical disc, if the reflective layer is affixed only to the data pit portion 9, the return light volume from the data pit 9 needs to be equal to 1. The pit width corresponding to the return light volume equal to 1 is not less than 1 μm. As for the pit length, an equivalent signal is thought to be achieved by setting the pit length so as to be equal to the pit formed by the crests and valleys. Therefore, if the pit width W2 is 1 μm and the pit rate L along the circumferential direction is 0.5, the signal level approximately equal to the conventional signal level can be obtained. If the track pitch W1 is 1 μm, the rate of the interrupted portions of the recording layer is 1−0.5=0.5, such that, even if the reflective layer itself has the transmittance T1 equal to zero, the average transmittance T is equal to 0.5, thus realizing a sufficient transmitted light volume.

The double-layer optical disc has the reflective layer having the transmittance on the order of 20 to 30%. Although the reflectance is lower than the reflectance of the aluminum reflective layer of the order of 80%, the unobjectionable signal quality is obtained. If 0.25 times the above-mentioned reference signal level is used as a target, it is seen from FIG. 8 that the pit width W2 of the order of 0.15 to 0.20 μm is sufficient. If the track pitch W1 is 1.2 μm, the rate of the interrupted portion of the recording layer is 1−0.15/1.2≈0.88, such that, even if the transmittance T1 of the reflective layer is zero, the average transmittance T on the disc surface is 0.88, thus realizing a further sufficient transmitted light volume.

Among the recordable type recording layers, there are a phase transition recording layer, an organic dye recording layer and a magneto-optical recording layer, as mentioned above. With the phase transition recording layer or the organic dye recording layer, the pit and the portion other than the pit differ in reflectance or in the phase of the reflected light. Such difference in the pit and the portion other than the pit can be detected for reproducing the information signal recorded in the recording layer. In the magneto-optical recording layer, the pit and the portion other than the pit differ in the direction of light polarization of the reflected light. Such difference in the direction of light polarization can be detected for reproducing the information signal. Insofar as the difference in reflectance and the difference in the direction of light polarization is concerned, the relation between the track width and the return light volume is as shown in FIG. 8. That is, for the track width equal to zero, the return light volume is also equal to zero. If the track width is smaller than the spot size, the return light volume is increased with increased track width. If the track width is sufficiently larger than the spot radius, the return light volume is equal to 1.

In a conventional recordable type optical disc, a recording layer is formed on a transparent substrate in which a spirally extending guide groove or plural concentric guide grooves are formed. Between the groove turns or concentric grooves or in the groove turns or concentric grooves are formed pits.

Figure 4:
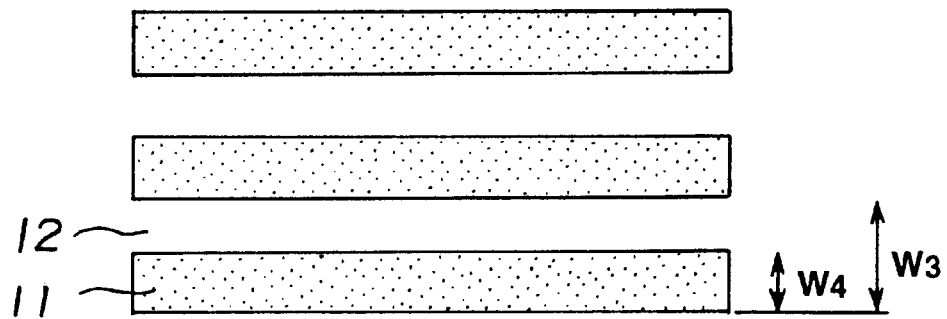
FIG. 4 is a schematic view showing another interrupted pattern of a first recording layer.

In the optical disc shown in FIG. 4, the recording film material is affixed only to the area in register with the recording track(s) 11 on the transparent substrate and pits are formed in these recording track(s).

In the conventional optical disc, the return light from the groove and that from the land interfere with each other to decrease the light volume. This lowers the signal level as compared to that from the planar area. For example, if, in a magneto-optical disc, the track pitch is 0.85 µm, the groove depth is 70 nm and the groove width (recording track width W) is 0.6 µm, and the laser light having the wavelength λ of 690 nm and the numerical aperture NA of the objective lens of 0.55 is illuminated, the volume of the return light received by the photodetector is on the order of 40% of the return light volume from the planar area. With such magneto-optical disc, optimum playback signals are obtained by setting the playback power to approximately 1 mW.

In light of the above-mentioned conventional recordable optical disc, the recording film material needs to be formed at a track width corresponding to the return light volume of 40% in the case of the optical disc on only the recording track 11 of which is affixed the recording film material. Referring to FIG. 8, the track width corresponding to the return light volume of 40% is 0.3 µm, such that the signal level approximately equal to that of the conventional disc may be obtained with the track width W4 of 0.3 µm. If, in such case, the track pitch W3 is 1.2 µm, the proportion of the interrupted portions of the recording layer is 1−0.3/1.2=0.75, such that, if the recording layer has the transmittance T1 equal to zero, the average transmittance on the disc surface T is 0.75, thus realizing a sufficient transmitted light volume.

Since the recordable type optical disc drive is usually provided with a high-output laser for recording, the playback power on the order of 2 mW can be obtained by using this high-output laser for reproduction. With such playback power, the signal level equivalent to that obtained with the conventional disc can be obtained with the return light volume on the order of 20%. Referring to FIG. 8, the track width for the return light volume of 20% is 0.14 µm. In this case, the proportion of the interrupted portions of the recording layer is 1−0.14/1.2≈0.88, such that, if the recording layer has the transmittance T1 equal to zero, the average transmittance on the disc surface T is 0.88, thus realizing a sufficient transmitted light volume.

Among the recordable type recording layers, there are a phase transition recording layer, an organic dye recording layer and a magneto-optical recording layer, as mentioned above. Since the signal level is higher for these recording layers than for the magneto-optical recording layer, a sufficient signal quality may be realized if the track width is set so as to be narrower than that of the photomagnetic recording layer, thus further improving the transmittance.

Meanwhile, the recordable type optical disc is usually provided with an address area in which to record the address information. In the conventional optical discs, this address information is written as a pattern of crests and valleys. In the optical disc of the instant embodiment, the recording layer material may be affixed only to the portions of the optical disc in register with the address pits without forming the address information by crests and valleys.

Although the proportion of the interrupted portions of the first recording layer 2 has been explained above, the second recording layer 4 may or may not be devoid of the recording film material. If, in the second recording layer 4, it is desired to suppress fluctuations in the cross-talk caused by laser power fluctuations or insufficient pit erasure, it is sufficient if the film material between the recording tracks is interrupted, as n the case of the first recording layer 2.

In the optical recording medium of the present invention, the recording layer may be of a sole layer or of multiple layers, such as three or four layers, instead of being of a two-layer structure. In case of a multi-layer structure, the recording film material for each of the second, third and the fourth recording layers may be interrupted in consideration of the illuminated laser light volume or reflected laser light volume in each of the recording layers for controlling the transmittance.

Figure 9:
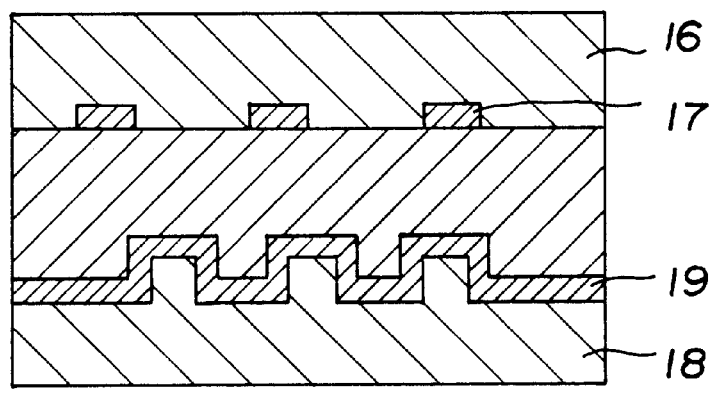
FIG. 9 is a schematic cross-sectional view showing essential portions of another optical recording medium embodying the present invention.

In the optical disc shown in FIG. 1, the laser light is illuminated from the side of the transparent substrate 1. However, in the case of an optical disc in which the laser light is illuminated from the side of the protective layer for recording and/or reproduction, at least the recording film material of the recording layer 17 towards the protective layer 16 is partially depleted, as shown in FIG. 9. In this case, the recording layer towards the substrate 18 need not be interrupted or may be interrupted for suppressing fluctuations in the amount of cross-talk or insufficient pit erasure. In the optical disc illuminated from the side of the protective layer by the laser light, the recording layer need not be of two layers but may also be formed by a sole layer or three or more layers. For the protective layer, an optically transparent material, such as UV curable resin, plastics or glass, may be used.

With the above-described optical recording medium of the present invention, at least the laser light incident side recording layer is depleted partially. The recording layer comprised of the partially depleted recording film material may be formed by a gas-phase plating technique, such as sputtering or vapor deposition. Six examples of the method for forming the recording layer are given below.

(1) With the first method, crests and valleys are formed on a substrate 20 in meeting with a pattern of forming the recording layer. For depositing the recording layer only on the portions of the substrate 20 in register with the recording track(s) or pre-pits, the substrate 20 is so formed that the portions thereof in meeting with the recording track(s) or pre-pits become protrusions. The crests and valleys are formed by injection molding or by a photopolymer method if the substrate is formed of a plastics material or by a glass substrate, respectively.

Figure 10:
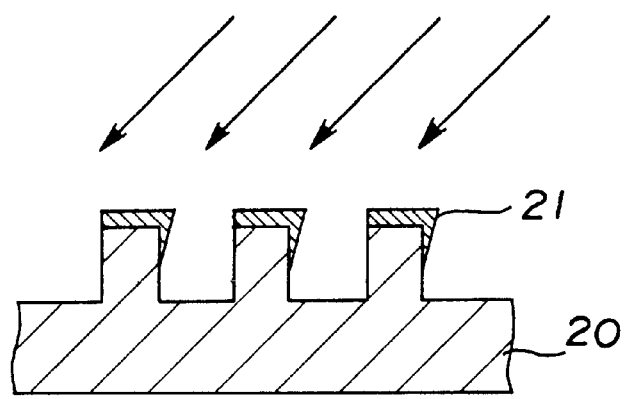
FIG. 10 shows the step of forming an interrupted recording layer and showing the state of oblique incidence of a recording film material on the recording film material.

A recording film material 21 is supplied obliquely on the substrate 20, thus provided with the crests and valleys, by the sputtering method or by the vapor deposition method. At this time, the recording film material 21 is selectively heaped only on the protrusions of the substrate as shown in FIG. 10, so that the recording layer is formed only on the portions of the substrate 20 in meeting with the recording track(s) or pre-pits, as shown in FIG. 10.

(2) A substrate 22, provided with crests and valleys, is formed, as in (1). However, in this case, the portions of the substrate in meeting with the recording track(s) or pre-pits become valleys instead of crests.

Figure 11:
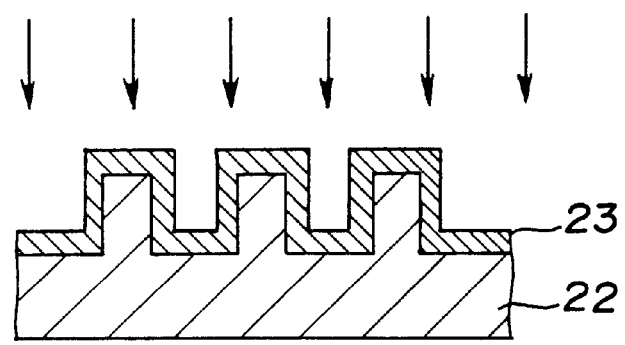
FIG. 11 is a schematic view showing the step of heaping the recording film material.
Figure 12:
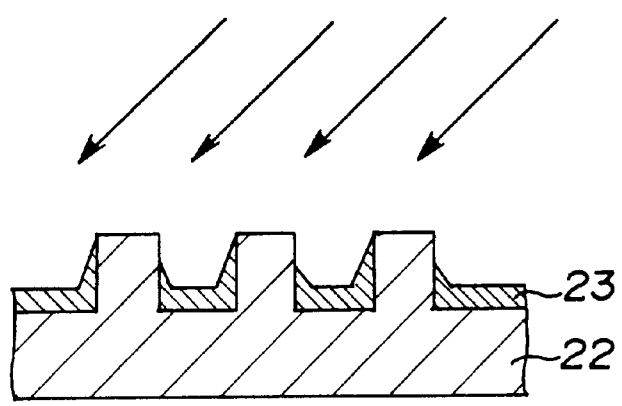
FIG. 12 is a schematic view showing an etching process for the recording film material.

Referring to FIG. 11, the recording film material is made to be incident on the substrate 22, provided with the crests and valleys, from a perpendicular direction, for uniformly heaping a recording film material 23 on both the valleys and crests. An etching gas is then made to be incident from an oblique direction to the heaped recording film material 23, as shown in FIG. 12. The result is that only the recording film material 23 heaped on the protrusions is selectively removed, with the recording film material 23 being left only on the portions of the substrate in meeting with the recording track(s) or pre-pits. As the etching gas, gases, ions or the plasma capable of chemically reacting with the recording film material 23 are used.

Figure 13:
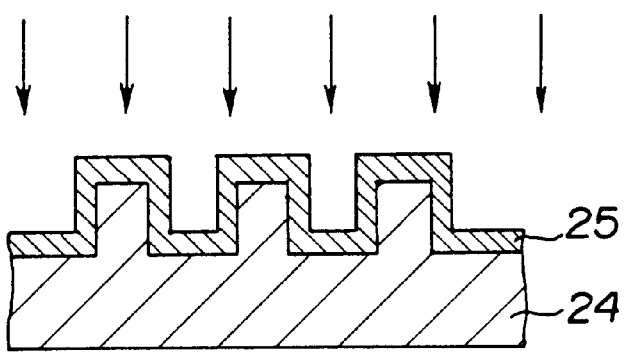
FIG. 13 is a schematic view similar to FIG. 11 showing the step of heaping the recording film material.
Figure 14:
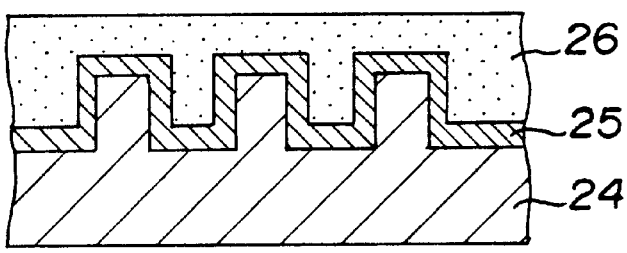
FIG. 14 is a schematic view showing the step of forming a resin layer.
Figure 15:
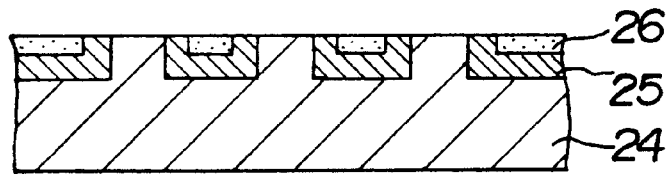
FIG. 15 is a schematic view showing the step of etching the resin layer, recording film material and protrusions.

(3) A substrate 24 in which portions in meeting with the recording track(s) or pre-pits are formed as valleys is prepared, as in (2). On this substrate 24, provided with the crests and valleys, a recording film material 25 is heaped uniformly, as shown in FIG. 13. On the heaped recording film material 25 is coated a liquid resin by, for example, spin coating, and cured to form a resin layer 26. This resin layer 26 flattens out the surface provided with the crests and valleys. The resin may be photoresist, UV curable resin or thermosetting resin. The resin layer 26 is then uniformly etched by plasma etching or reactive ion etching (RIE). With the progress of the etching, the recording film material 25 formed on the protrusions of the substrate is exposed. If the recording film material 25 and the resin layer 26 are further etched uniformly, the recording film material 25 formed on the protrusions is exposed and etched. If the processing is halted when the protrusions have been etched partway, as shown in FIG. 15, the recording film material 25 is left only in the valleys (recording layer or pre-pit). If an etching method in which the etching rate is material-dependent to a lesser extent, such as plasma etching, is used, the resin layer 26 and the recording film material 25 can be etched simultaneously. In this case, the etching process is managed based on time. If a method exhibiting high material dependency, such as RIE, is used, an etching gas proper for the resin 26 or the recording film material 25 is used. For example, the resin layer 26 is etched in an oxygen gas containing atmosphere. If the recording film material 25 is an Al metal reflective layer, it is etched in a chlorine gas containing atmosphere. The RIE and other etching methods may also be used in combination. In this case, the resin layer 26 is etched by RIE, while the Al metal reflective layer is etched by wet etching by weak acids or by plasma etching.

Figure 16:
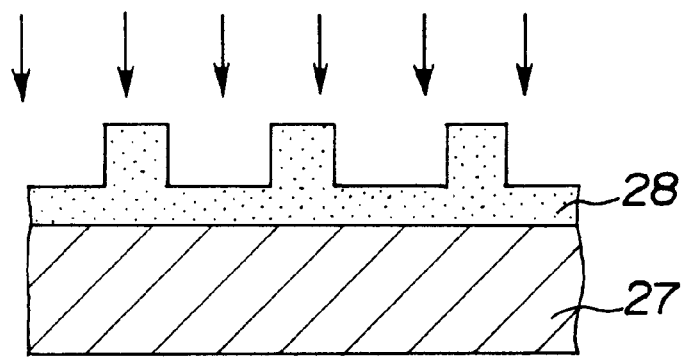
FIG. 16 is a schematic view showing the step of forming crests and valleys.
Figure 17:
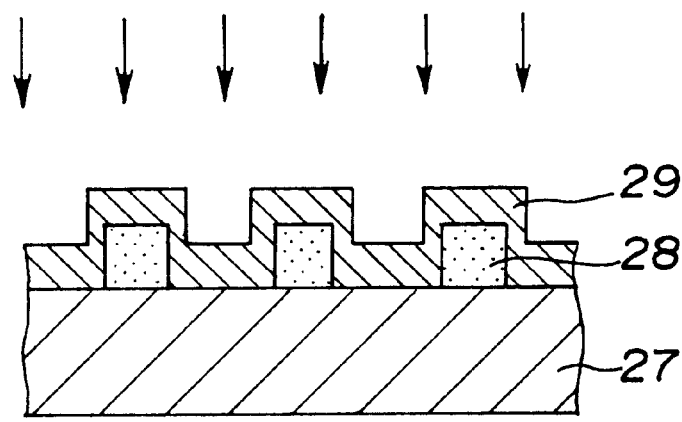
FIG. 17 is a schematic view showing the step of etching the recording film material.
Figure 18:
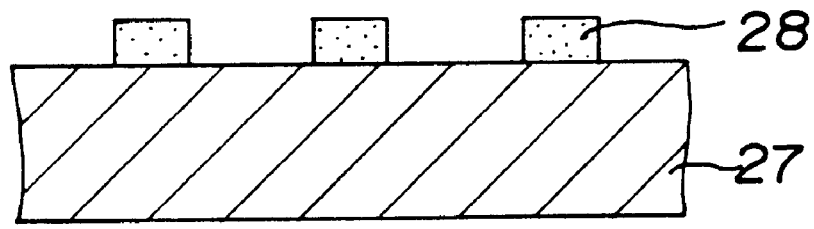
FIG. 18 is a schematic view showing the recording layer formed in a portion corresponding to the recording track or the pit.

(4) Referring to FIG. 16, crests and valleys are formed on a planar substrata 27 by, for example, a photopolymer method. The crests and valleys are so designed that the recording track or the pre-pit are in meeting with the valleys. A layer of the material 28 used for forming the crests and valleys is selected to be different in chemical properties from the substrate 27. The material layer 28 constituting the crests and valleys is uniformly etched by an etching method, such as RIE, for exposing the surface of the substrate 27 in register with the valleys. Then, as shown in FIG. 17, a recording film material 29 is uniformly heaped thereon, as shown in FIG. 17. The residual portion of the material layer 28 is removed by an organic solvent (lift-off). If the material layer 28 is removed, the recording film material 29 heaped on the material layer 28 is also removed from the substrate 27, so that the recording film material 28 is left only on the portion in meeting with the recording track or pre-pit, as shown in FIG. 18.

If, for positively stopping the etching of the material layer 28 on the surface of the substrate 27, and for facilitating removal of the material layer 28, a plastics substrate is used, the substrate surface may be coated with an inorganic material, such as glass.

Figure 19:
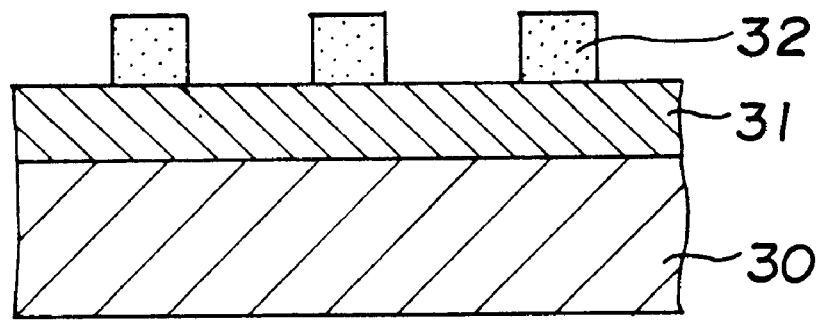
FIG. 19 is a schematic view showing the step of heaping the recording film material and forming a photoresist.
Figure 20:
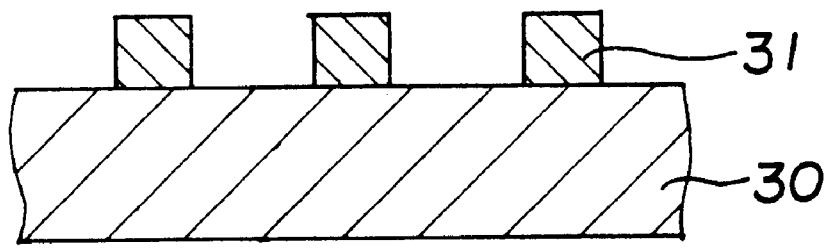
FIG. 20 is a schematic view showing a recording layer formed in portions corresponding to the recording track or the pit.

(5) Referring to FIG. 19, a recording film material 31 is heaped on the entire surface of a planar substrate 30. After coating the recording film material 31 with a photoresist, development is carried out for removing the resist from the portion of the substrate in register with the recording track or pre-pit. This development is carried out by direct drawing by laser, light exposure employing a reticle used in, for example, a semiconductor process, or by tight-contact light exposure employing a mask tightly contacted with the substrate. The portion of the recording film material 31 not coated with the photoresist 32 is removed by etching. Subsequently, the photoresist 32 is removed so that the recording film material 31 is left only in an area on the substrate in register with the recording track or pre-pit.

Figure 21:
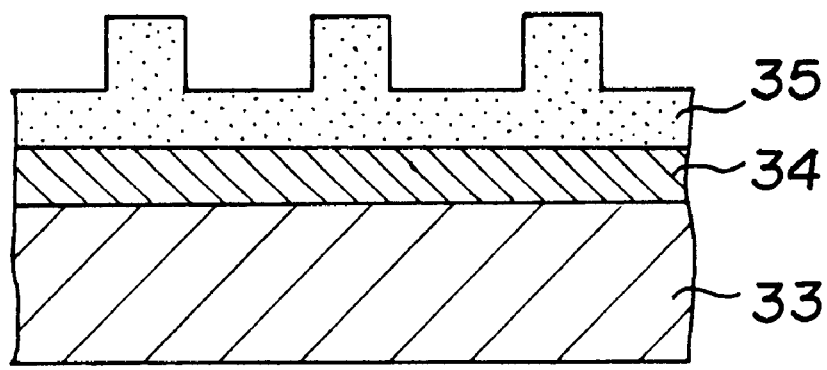
FIG. 21 is a schematic view showing the step of heaping the recording film material and forming crests and valleys.
Figure 22:
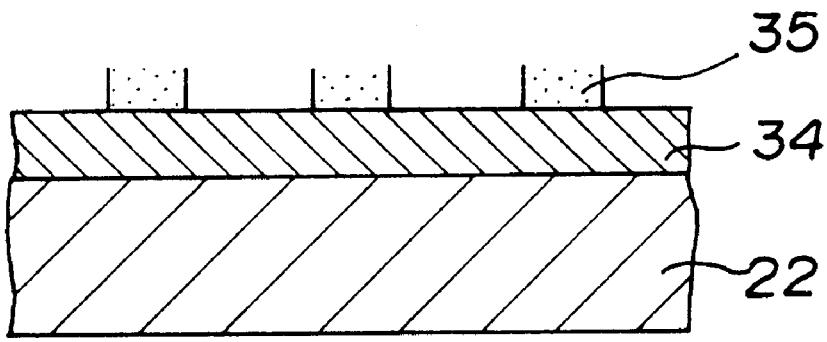
FIG. 22 is a schematic view showing the step of etching the crests and valleys.
Figure 23:
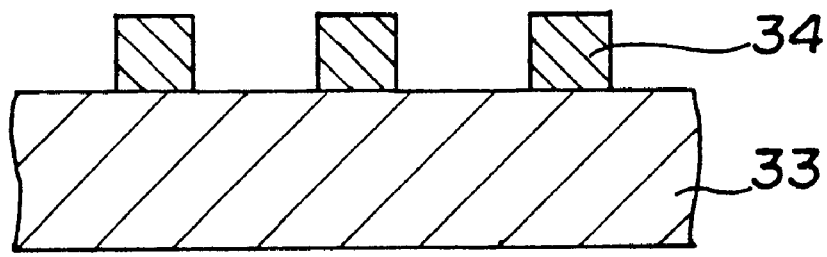
FIG. 23 is a schematic view similar to FIG. 20 showing a recording layer formed in portions corresponding to the recording track or the pit.

(6) Referring to FIG. 21, a recording film material 34 is heaped on the entire surface of the planar substrate 33, followed by formation of crests and valleys on the recording film material 34 by, for example, a 2P method. These crests and valleys are formed so that the crests are in register with the recording track or pre-pit. A layer if a material 35 forming these crests and valleys is then etched uniformly. This etching is carried ut by, for example, RIE under an oxygen atmosphere. With progress of the etching, the portions of the recording film material 34 corresponding to the valleys are exposed, as shown in FIG. 22. At this stage, the exposed portions of the recording film material 34 is etched off by wet or dry etching and residual portions of the material layer 35 is then removed. The result is that the recording film material 34 is left only in areas of the substrate corresponding to the recording track or pre-pit.

What is claimed is:

1. An optical disk recording medium comprising at least first and second recording layers at least one of which is formed on a substrate, characterized in that:

the disk has a laser incident side onto which a laser beam is projected;

the first recording layer is positioned nearest the laser incident side and has pre-pits formed in a plurality of tracks in a circumferential direction of the disk therein;

a second recording layer is positioned further from said laser incident side, the second recording layer characterized in cross section by crests and valleys;

a recording film material of the first recording layer is completely depleted between the tracks and partially depleted on the track in the circumferential direction, thereby providing interrupted portions allowing part of the laser light incident on the first recording layer to transmit through the interrupted portions into the second recording layer.

2. The optical recording medium as claimed in claim 1 characterized in that the light transmittance of the interrupted portion is higher than the light transmittance of the first recording layer itself.

3. The optical recording medium as claimed in claim 1 characterized in that the average light transmittance of the first recording layer is higher by not less than 10% than the light transmittance when the recording film material is coated on the entire surface of the substrate.

4. The optical recording medium as claimed in claim 1 characterized in that the area of the depleted portion of the recording film material accounts for 50 to 90% of the total substrate area.

5. The optical recording medium as claimed in claim 1 characterized in that the recording film material is depleted in the portions of the first recording layer from the laser light incident side lying between neighboring recording tracks.

6. The optical recording medium as claimed in claim 1 characterized in that two or more recording layers are formed on the substrate via spacers and in that neighboring recording layers are spaced from each other by said spacers a distance not less than a focal length of the laser light.

7. The optical recording medium as claimed in claim 1 characterized in that the first and second recording layers are formed on the substrate, the first recording layer on the laser light incident side is a read-only recording layer or a read/write recording layer, and in that the second recording layer is a read/write recording layer.

8. The optical recording medium as claimed in claim 1 characterized in that the substrate is a transparent substrate and in that the laser light is incident on the side of the transparent substrate.

9. The optical recording medium as claimed in claim 1 characterized in that the laser light is incident on the side of the recording medium opposite to the substrate side.

10. The optical recording medium as claimed in claim 1, wherein at least one of the first and second recording layers is a read/write layer.

* * * * *